Figure 4:
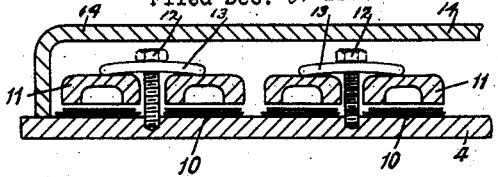

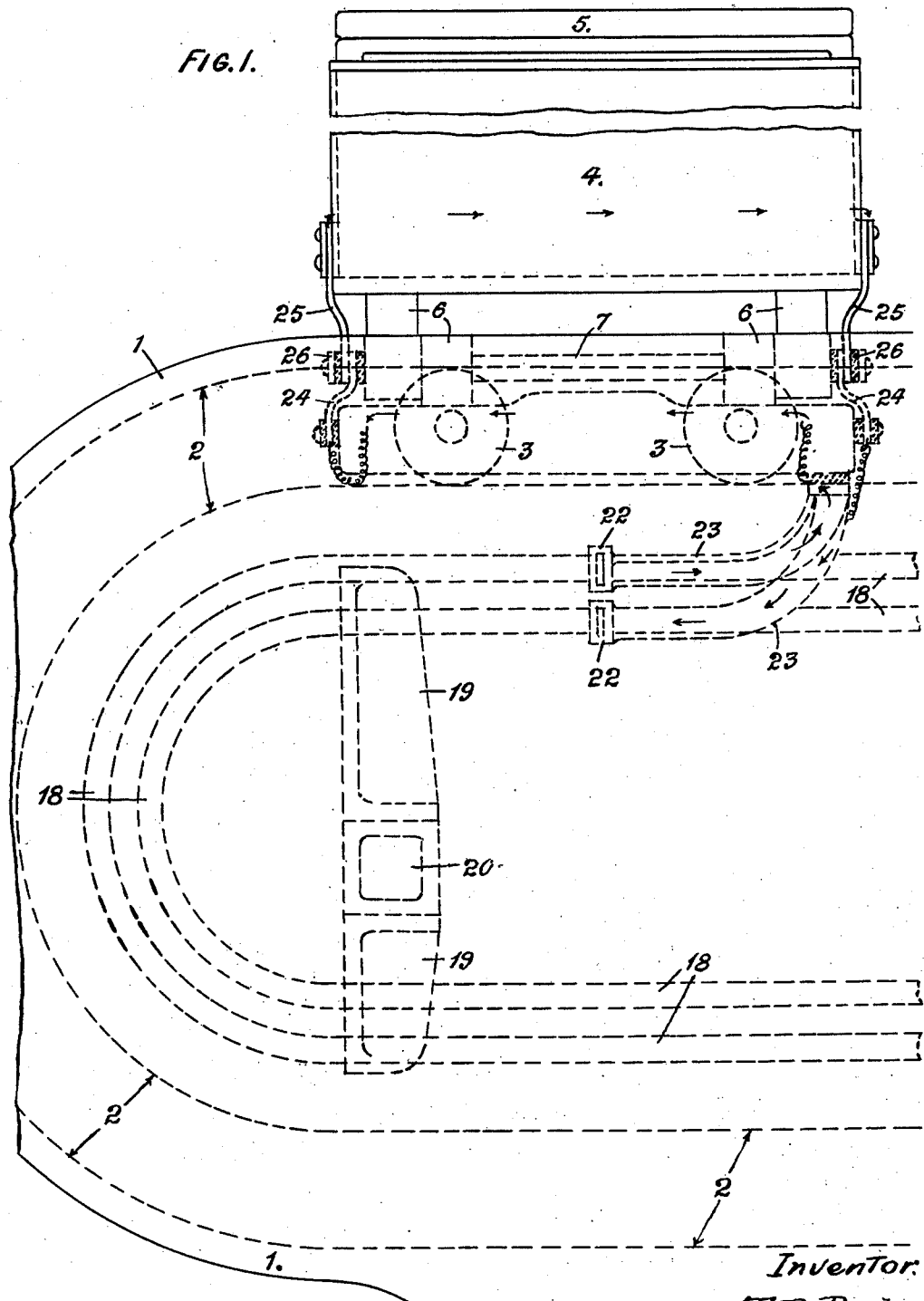

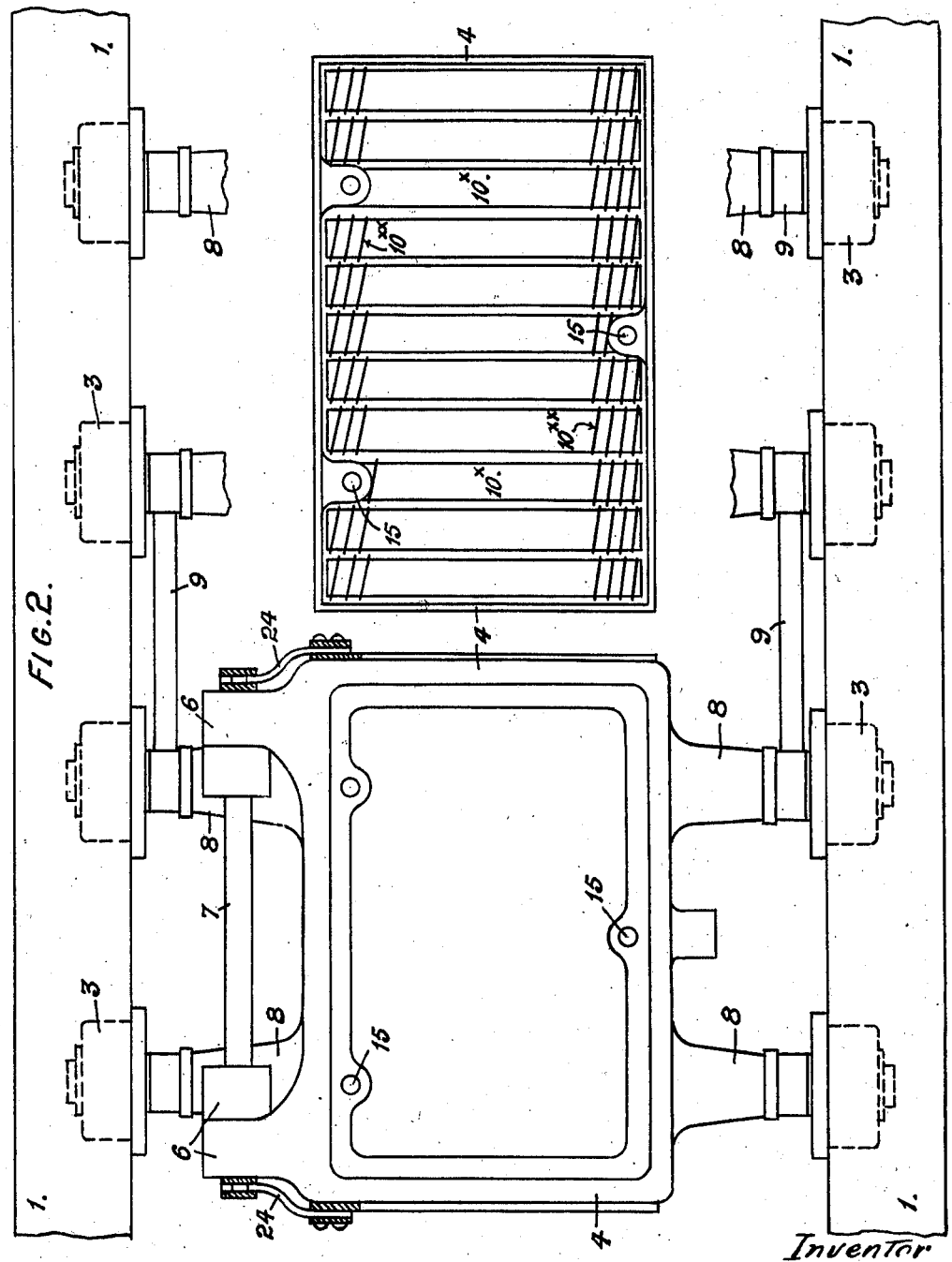

Oct. 13, 1925.  1,557,004
T. O. BATES
APPARATUS OR MACHINE FOR MAKING AND COOKING WAFER BISCUITS,
CUP WAFERS, CORNETS, AND THE LIKE
Filed Dec. 9, 1924     4 Sheets-Sheet 3

Inventor
T. O. Bates

Oct. 13, 1925.

T. O. BATES 1,557,004

APPARATUS OR MACHINE FOR MAKING AND COOKING WAFER BISCUITS, CUP WAFERS, CORNETS, AND THE LIKE

Filed Dec. 9, 1924 4 Sheets-Sheet 4

Inventor
T. O. Bates

Patented Oct. 13, 1925.

1,557,004

UNITED STATES PATENT OFFICE.

THOMAS OWEN BATES, OF LIVERPOOL, ENGLAND.

APPARATUS OR MACHINE FOR MAKING AND COOKING WAFER BISCUITS, CUP WAFERS, CORNETS, AND THE LIKE.

Application filed December 9, 1924. Serial No. 754,838.

*To all whom it may concern:*

Be it known that I, THOMAS OWEN BATES, a subject of the King of England, and residing at Liverpool, in the county of Lancaster, England, have invented Improvements in and connected with apparatus or machines for making and cooking wafer biscuits, cup wafers, cornets, and the like, of which the following is a specification.

This invention has reference to apparatus or machinery for making or cooking wafer biscuits, cup wafers, cornets, or other articles, from batter or liquid material, which is introduced between "plates" which are subject to heat, and the articles are so cooked; and it relates more especially (but not exclusively) to machines of this kind having a plurality of sets of "plates" (one of which is movable on a hinge in relation to the other), on carriages which are connected together in "endless" arrangement and travel a course, say one which is a horizontal, and semi-circular at each end, or circular over an endless track. In some cases, the movable plate will be opened and closed by an automatic means, such as cams or the like, when they come to the position in which the cooking of the articles will be complete, and are removed from the plates, and the plates recharged with a fresh charge of batter or the like.

The plates according to this invention are heated by electricity by electrically heated elements or units, and these heating elements or units are held on the outside surfaces of the two plates proper, which it may be assumed both consist of a single metal plate; and these plates with the electrical heating elements, are carried by carriers or carrier frames, which in an endless travelling kind of cooking machine are provided with wheels or mounted on wheeled or rollered carriages, which run on the machine tracks.

The plates may be lagged outside with suitable material being a non-conductor of heat, and which may extend practically for the whole area of the back of the plates; and the lagging may be extended to and carried round or over the outside edges of the plates proper.

Further according to this invention, the plates proper of wafer biscuit or like article making or cooking machines are adjustable in relation to their carriers, and truly in relation to the other plate, this being effected by screw studs passed through and supported in lugs or brackets or parts of or on the carrier of the plate, and nuts on either side of same; and these parts through which the screws pass may project out from the back or outside of same, and the securing nuts fitted below and above the brackets, so that the adjustment can be easily effected from outside the frame.

The other plate can be secured to its carrier by screws or screw studs or the like.

The actual cooking plates, as stated, are simple metal plates, and to them a multiplicity of electrical heating elements, (which if desired may have thin ribs or partitions between them) or units are secured.

Electric current may be supplied to the electrical units of the plates by movable arms and rollers or rubbing contacts on the plates, which bear on stationary electric conductors on the machine, and arranged along the path of travel of the "plates"; or it may be supplied through, or by parts of the tracks on which the wheels of the plate carriages run.

Figure 5:
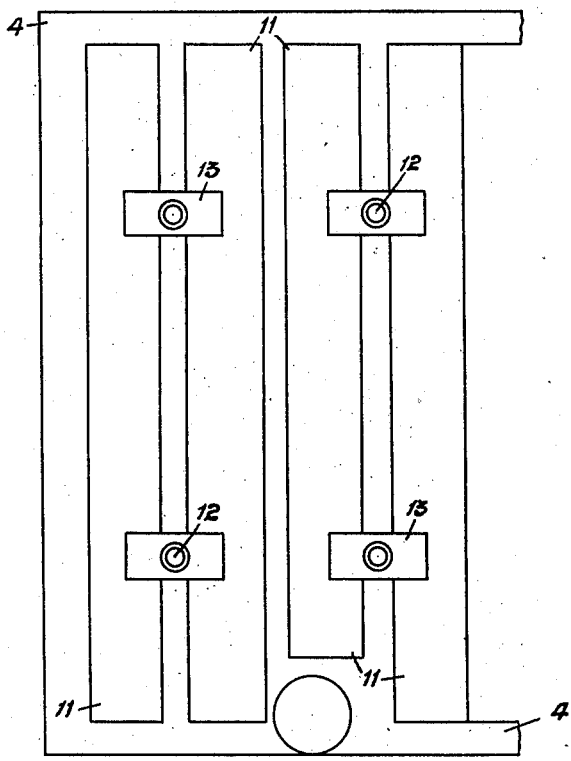
Figure 6:
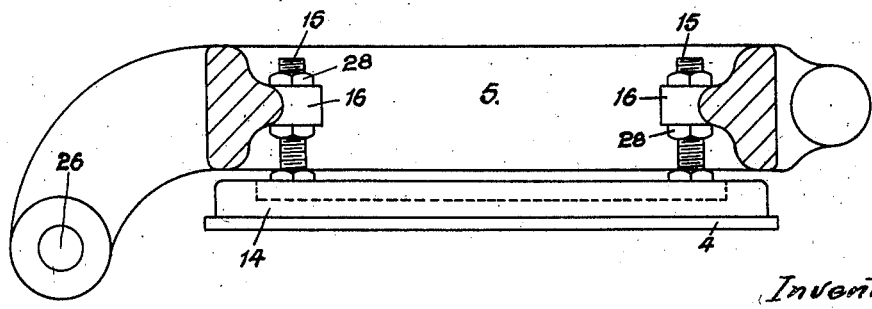

The invention is illustrated in the accompanying drawings, in which Figure 1 is a side elevation showing an endless travelling machine fitted with plates according to this invention; Figure 2 is a plan, and Figure 3 an end elevation of a machine of the kind referred to according to this invention; Figures 4 and 5 show in detail a construction of one form of electrically heated plates according to the invention; and Figure 6 is a detail showing the plate adjusting arrangement.

Referring to the drawings, 1 are the main side frames of the machine, having in them railways 2 as usual, in which wheels 3 of the lower carrier of the lower plates are supported and run, and it may be assumed the opening and closing of the plates is effected either by hand, or automatically, in any of the well known ways.

The heating plates proper are marked 4, and their carrier frames 5; and these frames as in the ordinary construction of such machines, are connected together by hinge lugs 6, and a hinge pin 7 at their back edges, about which hinge the upper plate is moved in opening and closing.

The lower carrier frames are supported from the frames 1 by the wheels 3 through projecting axles 8 in the usual way; and the adjacent axles of the successive plates are connected together by the links 9.

The electrically heated plates are constructed according to one arrangement as shown in detail in Figures 4 and 5.

The heating plate proper is heated by a multiplicity of heating elements 10, closely assembled in the plate, and each consisting of mica or like strip $10^x$ of insulating material, round which the resistance wire $10^{xx}$ of the unit or element is wound; and between the element and the plate 4, is another strip of mica, and then above it, and between it and the metal covers 11, is another strip of mica; and in the case shown these devices are held down firmly in position by means of screws 12 screwing into the plate 4, and by means of washers 13, pressing on to the backs of the bars 11. These sets of elements and their holding devices, are arranged in plurality on the plate, and are enclosed within a covering 14, which is held on to the plate by screws or any suitable means; and the whole plate arrangement is carried from the carrier frames 5 by three screw studs 15 fixed on the back or cover 14, and passing through the inner lugs or webs 16 on the inner part of the carrier frames, which otherwise may be open, and by means of which the plates can be adjusted as and for the purposes herein described.

Figure 3:
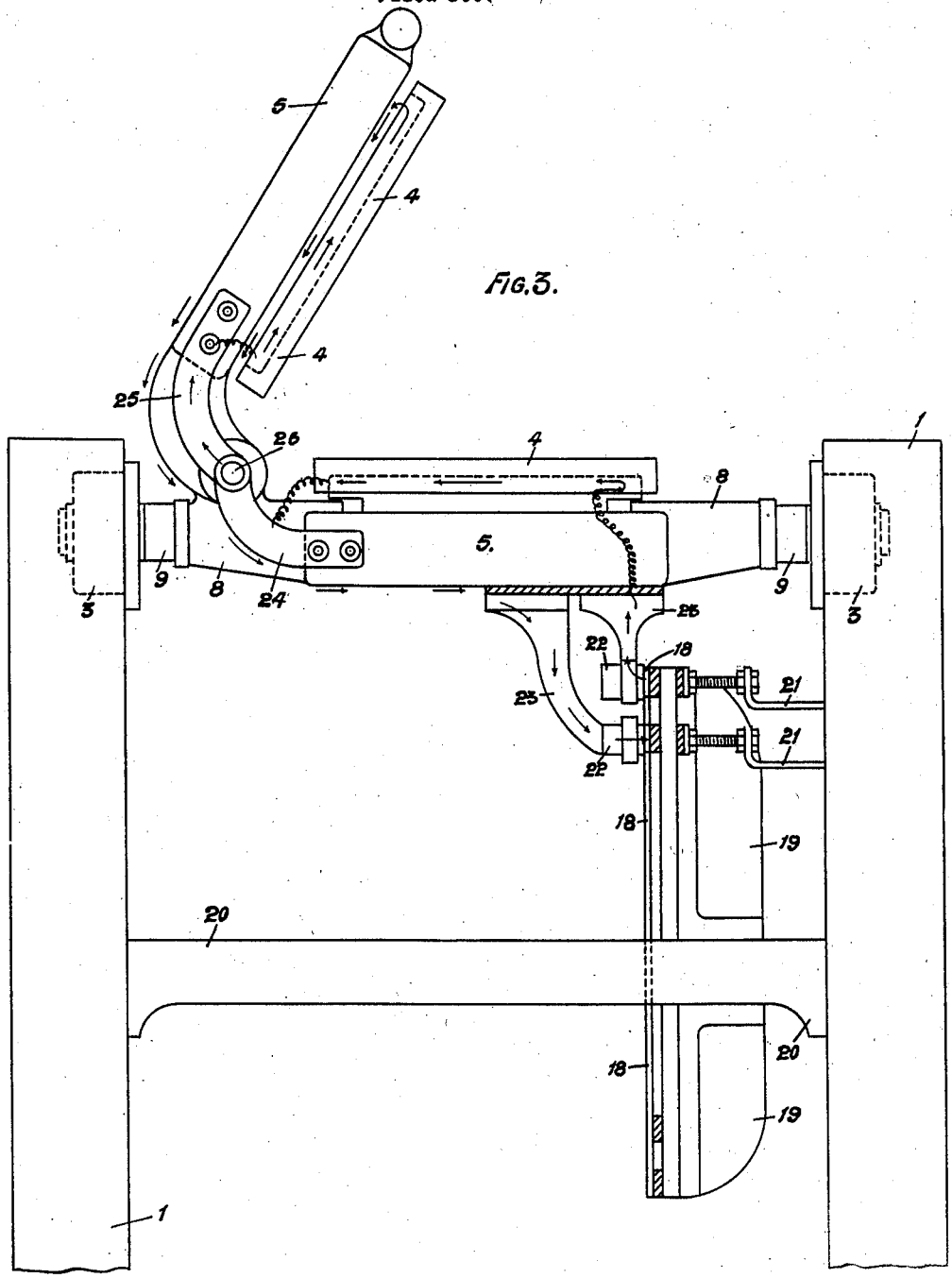

Electric current is conducted to the lower and upper plates 4 from endless copper or other rails 18, which are carried from and within the frames 1 by brackets 19 supported on cross frames 20; and these endless conductor bars are connected up with the supply and return conductors 21 in any suitable way, say as shown in Figure 3.

Current is taken from the bars 18 by contacts or brushes 22 carried on brackets or arms 23 attached to the bottoms of the lower plate frames 5, from which they are suitably insulated; and current is passed up to the elements of the plates 4, from one of the brackets 23, and then through the elements, and from this lower frame and plate, it is conducted by means of plates 24 attached to the frames 5, up to the elements of the upper movable plate 4, and thence by the plates 25, similar to 24, at the other side of the cooking plates it is conducted back from the upper plate and frame to the return bracket 23.

The arrows in the drawing indicate the course of the current.

The two sets of plates 24 and 25 are insulated from the frames 5 to which they are fastened at the ends, and they are connected together by a hinge connection at 26, as shown in the drawings, which are formed on the ends of the plate hinge pin 7, and from which they are suitably insulated.

The plates or their covers 14 may be suitably lagged outside with a suitable non-conductor of heat, and this lagging may extend to and carry round or over the outside edges of both the cover and the plates 4 if desired.

With regard to the adjustment of the upper plate 4 from its carrier frame 5, there are nuts 28 on each side of the lugs 16; and thus, by turning the nuts, the studs or screws 15, are moved in one direction or the other, and the exact required adjustment of the distance between the two plates 4, when closed, can be obtained, and the surfaces of these plates made perfectly parallel.

The other plate 4 can be carried from its carrier 5 by three permanent screws 15.

The heating elements 10 are disposed closely together on the plate 4, so that the plate will be heated practically all over uniformly; uniformity of temperature of different parts of the plate being an important condition for the proper cooking and production of articles.

In some cases, a switch is used in connection with the different plates or each plate, say on the end of the hinged joint of the plates, by which an attendant can switch off current either wholly or more or less from any particular plate or plates should they be too hot.

What is claimed is:—

An electrically heated plate for apparatus or machines for making or cooking wafer biscuits, cup wafers, cornets or other confections, the combination of a plate proper, a plurality of separate flat heating elements, each consisting of a thin sheet of insulating material wound with a wire conductor, metal strips on the hinge side of the plates having a hinge connection, the axis of which is coincident with the axis of the said plate hinge.

In testimony whereof I have signed my name to this specification.

THOMAS OWEN BATES.